United States Patent [19]
Lewis

[11] 3,844,411
[45] Oct. 29, 1974

[54] OBJECT SEGREGATING MECHANISM

[76] Inventor: Michael Lewis, R.D. No. 2, Felton, Pa.

[22] Filed: May 15, 1973

[21] Appl. No.: 360,522

Related U.S. Application Data

[63] Continuation-in-part of Ser. No. 291,731, Sept. 25, 1972, abandoned.

[52] U.S. Cl.................... 209/73, 209/108, 209/90
[51] Int. Cl...................................................... B07c
[58] Field of Search............ 209/72, 108, 90, 73, 74

[56] References Cited
UNITED STATES PATENTS

| | | | |
|---|---|---|---|
| 1,199,231 | 9/1916 | Beythan............................ | 209/108 |
| 2,656,921 | 10/1953 | Gray et al.......................... | 209/108 |
| 2,657,798 | 11/1953 | Young................................ | 209/108 |
| 3,473,658 | 10/1969 | Bartlett, Jr........................ | 209/108 |

FOREIGN PATENTS OR APPLICATIONS

| | | | |
|---|---|---|---|
| 914,666 | 1/1963 | Great Britain...................... | 209/90 |

*Primary Examiner*—Allen N. Knowles
*Attorney, Agent, or Firm*—C. Hercus Just

[57] ABSTRACT

A machine to segregate relatively smooth-surfaced sphere-like objects from relatively rough-surfaced sphere-like objects by mechanism which conveys a heterogeneous mixture of said objects along a path for engagement by detecting means positioned relative to said path at a location to be engaged by the objects, said detecting means being reactive respectively to the relatively smooth-surfaced and rough-surfaced sphere-like objects and operable to move the smooth-surfaced objects from said path for discard but pass the rough-surfaced objects to permit the same to continue to move along said path and thereby effect segregation of the rough-surfaced from the smooth-surfaced objects.

31 Claims, 13 Drawing Figures

OBJECT SEGREGATING MECHANISM

This application is a continuation-in-part of application Ser. No. 291,731, filed Sept. 25, 1972 now abandoned.

BACKGROUND OF THE INVENTION

This invention primarily pertains to a machine or mechanism adapted especially to segregate wanted from unwanted objects, particularly where the wanted objects are relatively smooth-surfaced and are sphere-like in shape, while the unwanted objects are relatively rough-surfaced, generally sphere-like objects. One practical example of such objects is potatoes which are relatively smooth-surfaced. When harvested, they are removed from the ground and are intermixed with rocks and clods of earth, many of which are somewhat sphere-like in shape, especially the hard clods of earth after the same has been jostled around on a potato harvesting machine having a series of cross-bar type belt conveyors along which the potatoes, clods and rocks move while sifting a certain amount of finer sizes of unwanted materials through the spaces between the bars of the conveyor.

The present practice for removing the rocks and clods from potatoes involves substantial amounts of manual labor in which the workers either sit upon a machine traveling over a field and pick the clods and rocks from the potatoes, or vice versa, as the same are elevated upwardly in the machine from the position in which they were harvested from their location below the surface of the ground.

Certain attempts also have been made to segregate various types of wanted from unwanted materials by means of flotation baths in which, for example, the wanted objects float whereas the unwanted objects sink within certain solutions which are used. This type of procedure involves waterproof tanks and therefor, normally, such mechanisms are contained in sorting or packing sheds to which the material is brought by trucks or wagons from the harvest field, or orchards in the event fruit is involved.

In regard to segregating potatoes from stones and clods, previous attempts have been made and are disclosed in the patent art. For example, U.S. Pat. No. 1,182,144, in the name of Corbin, dated May 9, 1916 involves mechanism in which the potatoes and stones are separated by flexible fingers which retain the potatoes as they contact the same during movement along a path, while the stones are thrown from the fingers. Another prior U.S. Pat. No. 2,013,409, in the name of Hostetter, dated Sept. 3, 1935, utilizes certain types of belt means and dividing members to effect separation of potatoes from clods and stones.

An example of a potato harvester in which operatOrs stand upon the machine and pick stones and clods from the conveyor to segregate the same from the potatoes is shown in U.S. Pat. No. 2,656,921, to Gray at el, dated Oct. 27, 1953. Still another U.S. Pat. No. 2,828,012, to Komuchar, dated Mar. 25, 1958, effects separation of potatoes from stones, clods and other trash by moving flailes which extend transversely of the conveyor upon which the potatoes are moved, the mechanism being operable to cause the potatoes to jump over hurdles, while the stones don't effect such jumping movement and are moved to the end of the conveyor for discharge onto the ground.

SUMMARY OF THE INVENTION

It is the principle object of the present invention to provide segregating mechanism operable to segregate relatively smooth-surfaced sphere-like objects from relatively rough-surfaced sphere-like objects by the use of detecting means arranged to cause a rotation of the relatively smooth-surfaced potatoes and cause the same to move along a desired path for discharge therefrom, while rough-surfaced objects such as clods and stones are incapable of any appreciable amount of rolling, whereby said detecting means is contacted by the rough texture of said unwanted objects in a manner to cause the detecting means to function in a way to move the same in a direction to segregate them from the desired smooth-surfaced objects and direct them to discharge from the mechanism as waste, for example.

It is a further object of the invention to provide several embodiments of segregating mechanisms, one of which comprises a series of conveyors adapted respectively to receive size ranges of heterogeneous mixtures of rough-surfaced and smooth-surfaced sphere-like objects, each of said conveyors having a detecting means positioned above the upper surface thereof in accordance with the principles of the invention and operable to accomplish such detection as is described hereinabove.

Still another object of the invention is to provide said detecting means with a transversely extending member disposed at an angle other than 90° to the axis of the conveyor for purposes of deflecting the rolling, smooth-surfaced objects to one side of the conveyor for removal therefrom, while rough-surfaced objects engage said member in a frictional manner so as to cause movement of said member away from the conveyor a suitable distance to permit the rough-surfaced objects to pass beneath said member and continue along a given path of movement thereof until discharge onto a field for example, or otherwise.

A further object of the invention is to dispose the transversely extending members of the detecting units respectively different distances above the conveyors in accordance with the size ranges of sphere-like objects to be moved by the individual conveyors of such series thereof, as referred to above, and thus facilitate the diverting of the smooth-surfaced objects while the rough-surfaced objects pass beneath the transversely extending detecting members.

One further object of the invention is to provide sorting means in association with the segregating mechanism so as to separate selected size ranges of objects from each other; however, the mechanism also includes transfer means by which said various size ranges of objects are carried in predetermined manner to respective conveyors therefor by which the objects are moved to the detecting mechanisms having the characteristics and features setforth above.

One other object of the invention is to provide conveyors which have at least yieldable surfaces thereon to permit compression by the various objects as they engage the detecting mechanism and thus facilitate the segregation of wanted from unwanted objects in accordance with the character of the outer surfaces thereof which is the basis upon which the segregating mechanism is caused to operate.

It is a further object of the invention to provide another embodiment of segregating mechaniam which, as desired, may be mounted for operation in a packing shed, or the like, or with equal facility may be mounted upon a mobile harvesting machine and be driven by the motive means for the machine, said embodiment preferably comprising a single belt or apron type of conveyor or impeller forming trough-like means mounted at a desired decline so that as a heterogeneous mixture of smooth-surfaced and rough-surfaced objects are moved along said trough-like means in a tumbling manner, due to movement of said apron in a direction transversely to the axis of said trough-like means, detecting means are provided in cooperative relation with said apron which are engaged by the rough-surfaced objects in a manner to move the detecting means from the normal position and cause said objects to be rolled laterally to waste discharge from one side of said mechanism, while the smooth-surfaced objects continue to move down the trough-like means for appropriate useful collection.

One further object of said another embodiment of the invention is to provide a series of pivoted hook-like plates each mounted with a depending flange terminating adjacent one side of said trough-like means, the terminal edges of said flanges being frictionally engageable by rough-surfaced objects and, due to continued movement of said apron relative to said flanges, the rough-surfaced objects cause said flanges to raise to form a passage through which said objects are rolled between said flanges and apron laterally from the axis of the trough-like means to waste discharge, while smooth-surfaced objects merely slide against said flanges without raising them.

Another object of the latter embodiment of the invention is to provide a series of flexible damping members respectively carried by each of the hook-like plates operable to smooth out the flow of objects moving axially along said trough-like means, said hook-like plates having a normally upper, substantially horizontal flange which is hingedly connected to one side of said trough-like means and each of said plates having similar, limited width, and said damping members being connected to said horizontal flanges of said plates adjacent the upstream edges thereof.

One further object of the latter embodiment is to provide an inlet hopper arranged to receive a heterogeneous mixture of smooth and rough-surfaced objects and arrange the same into a tumbling mass discharged from one end of said hopper, the opposite sides of said hopper sloping upward and outward and one side comprising an endless moving apron, the outermost course of which moves upwardly, said apron terminating at one end in spaced relationship to the discharge end of said hopper to prevent an abnormal mass of said objects from being moved upwardly and out over the top of said hopper.

Still another object of the latter embodiment of said invention is to form said trough-like means from a series of similar elongated slat-like members spaced apart transversely even distances less than the diameter of desired object to be fed therealong, said members being attached at opposite ends to endless flexible members extending around circular drive and guide members, and guide shoes engaging said flexible members to cause them to move in similar curved paths to form a trough in one course of said trough-like means.

Details of the foregoing objects and of the invention, as well as other objects thereof, are set forth in the following specification and illustrated in the accompanying drawings comprising apart thereof.

DETAILED DESCRIPTION

As indicated hereinabove, the present invention pertains to mechanism operable to segregate, in particular, relatively smooth-surfaced sphere-like objects from relatively rough-surfaced sphere-like objects. One typical example of such type of objects is encountered in the harvesting of potatoes. In general, potatoes usually are harvested by means of certain types of plows or scoops which are moved down a row of potatoes when they are ready for harvesting to un-earth the same. Rocks and clods of earth also are distributed along a harvested row of the potatoes, intermixed therewith heterogeneously. It is neccessary to separate the potatoes from the unwanted rocks or stones and clods of earth, many of which closely resemble the potatoes in size, color and general shape. In areas of the country where mechanized equipment is not very prevalent, human labor is used to pick the potatoes from such unearthed rows thereof and gather the same into suitable receptacles such as bags, or otherwise. This type of work is very arduous, tiring, and back-breaking.

For a number of years, mechanized potato harvesters have been available which, as the potatoes are unearthed thereby from the ground along with rocks and clods of earth, they are all elevated by various types of, usually, rod-like flexible conveyors which tend to jostle the items and shake at least some of the smaller stones and loose particles of earth from the potatoes. Such an operation is of several types. One such type results in discharging the potatoes and larger stones and clods of earth back upon the ground but in a condition in which the potatoes readily may be picked by hand and deposited in suitable containers. Another type includes much less manual operation and deposits a heterogeneous mixture of potatoes, large clods of earth and stones in a suitable conveyance for transportation to a sorting shed or the like, where a number of workers separate the potatoes from the unwanted stones and clods, manually, as the mixture moves along a conveyor or other suitable sorting mechanism.

In all of the operations thus far described above, it will be seen that a substantial amount of manual effort is required. In modern harvesting operations, such labor is relatively expensive and it is the principle purpose of the present invention to minimize the amount of manual labor required to effect in particular the grading of potatoes according to size and the separation of certain size ranges thereof from unwanted materials such as stones and clods of earth in particular, as well as other less common types of unwanted material.

Figure 1:
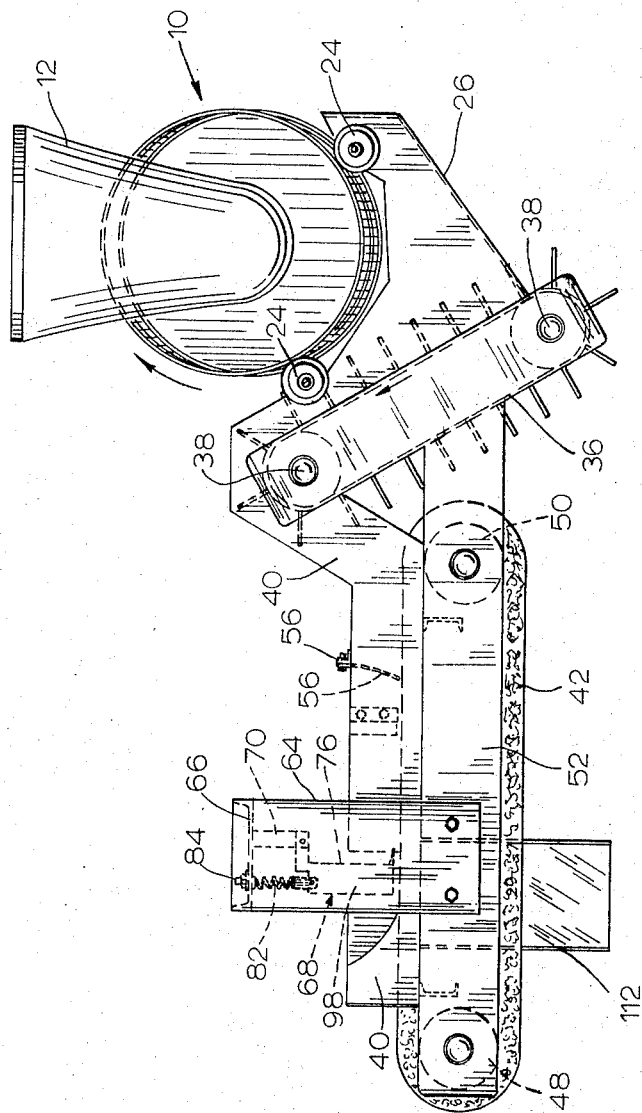
FIG. 1 is a side elevation of one embodiment of an exemplary mechanism embodying the principles of the present invention and showing suitable sizing and transfer mechanism by which the objects to be segregated from each other are delivered to conveyor means with which detecting mechanism is associated.
Figure 2:
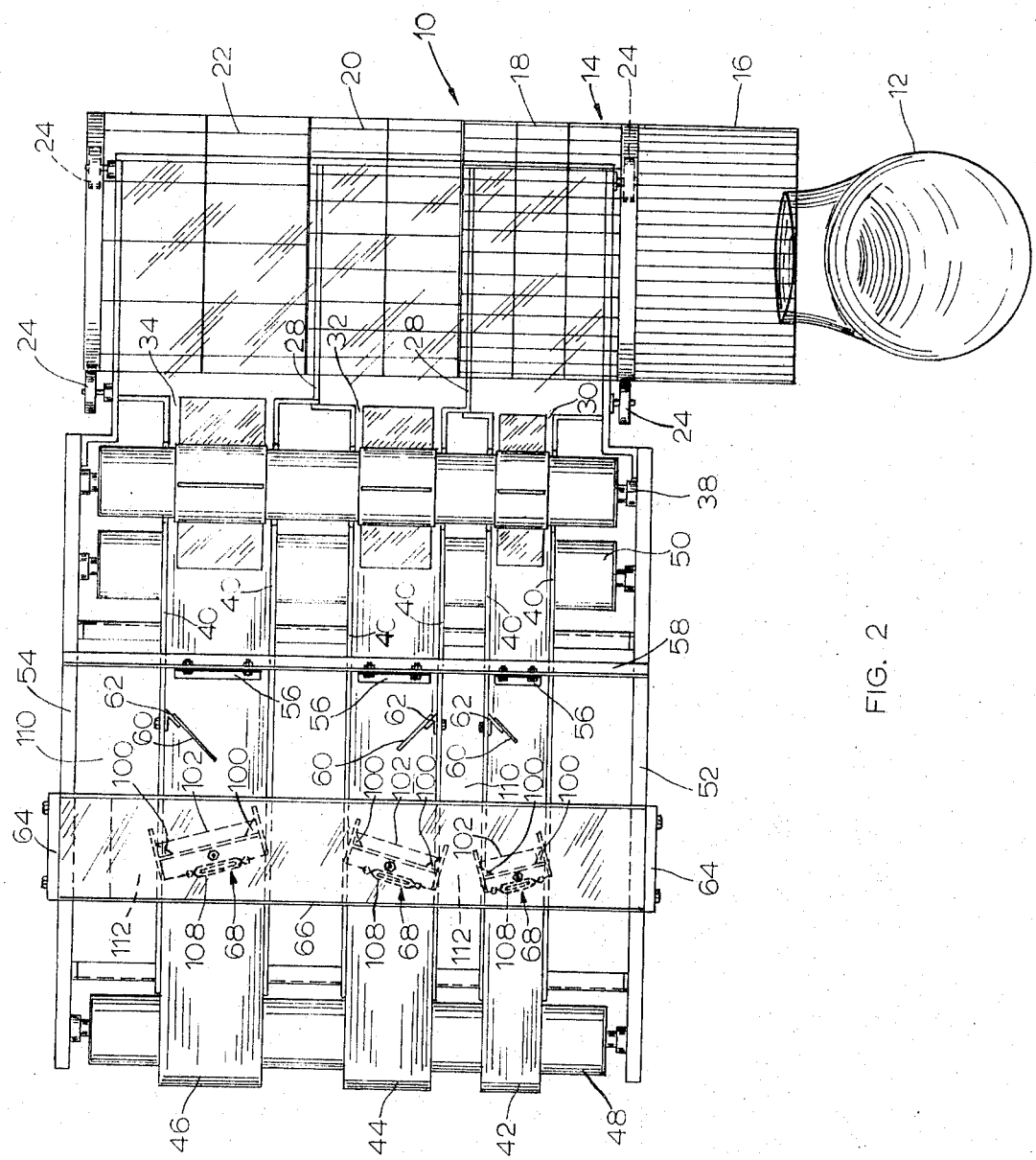
FIG. 2 is a top plan view of the exemplary mechanism shown in FIG. 1.
Figure 3:
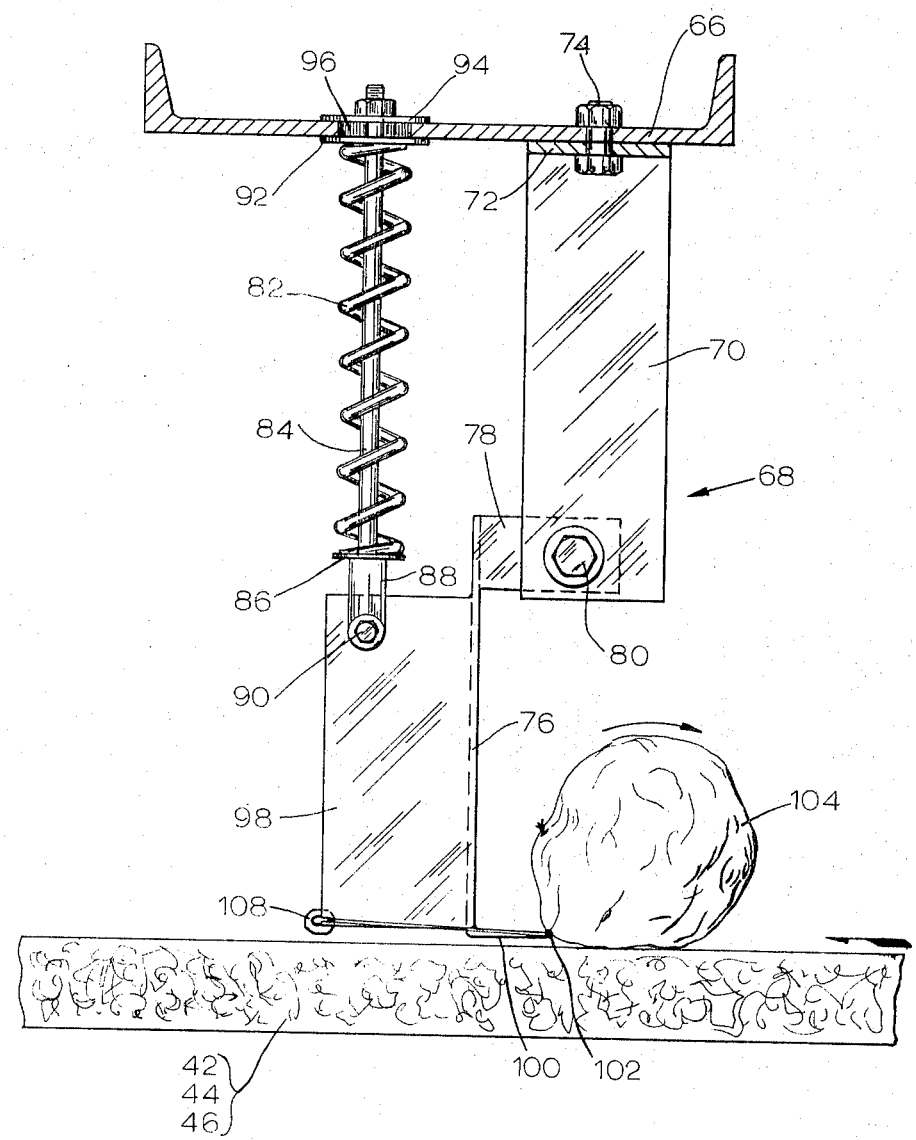
FIG. 3 is an enlarged, fragmentary and partially sectioned view of the detecting mechanism in process of being engaged by a smooth-surfaced sphere-like object and being operable to rotate the same for diversion thereof from one side of the conveyor.
Figure 4:
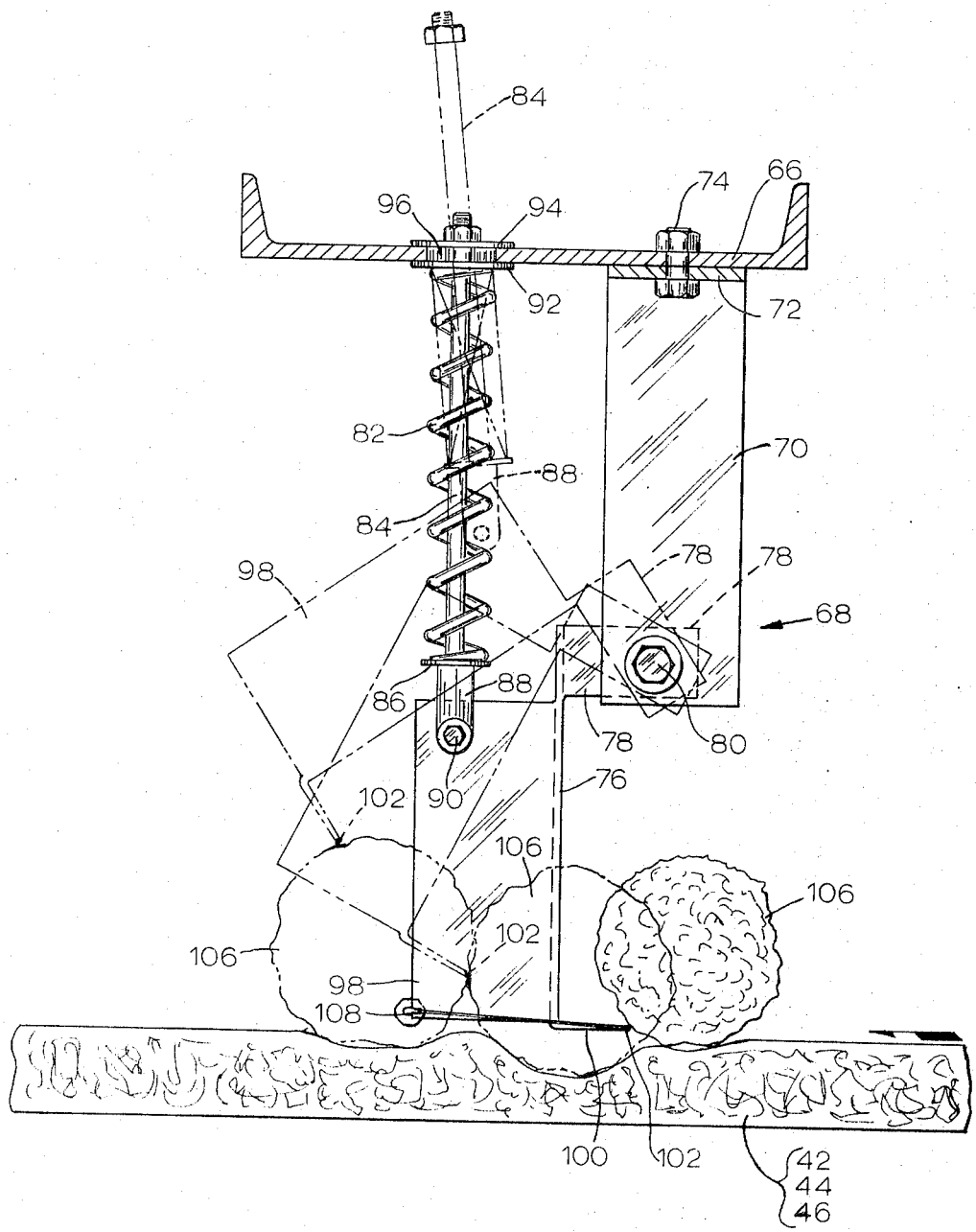
FIG. 4 is a view similar to FIG. 3 but illustrating a relatively rough-surfaced object encountering the detecting mechanism and showing exemplary initial engagement between the object and the mechanism in full lines, while in phantom, two subsequent and sequential positions of the detecting means are illustrated to show the procedure by which such rough-surfaced objects are passed beneath the detecting mechanism for discharge by the conveyor at one of the outer ends thereof and thereby separate said rough-surfaced from the smooth-surfaced ones which are diverted at an earlier station in the mechanism.

One exemplary embodiment of segregating mechanism which includes the principles of the present invention is illustrated in FIGS. 1, 3 and 4, and in FIG. 2, respectively in side elevation and plan views. This embodiment is the subject matter of original application, Ser. No. 291,731, filed Sept. 25, 1972, now abandoned. An additional embodiment is illustrated in FIGS. 5–12 and details thereof are described hereinafter. Both embodiments include certain basic, similar principles of operation.

The mechanism illustrated in FIGS. 1–4 includes a sorting or classifying unit 10 of somewhat conventional type. This mechanism includes an exemplary inlet hopper 12 which discharges into a revolving sorting screen 14 having sections in sequence respectively comprising section 16 through which relatively small stones and earth particles are discharged for removal by appropriate means, not shown. As the screen 14 rotates in an appropriate direction, such as clockwise, as indicated by the direction arrow in FIG. 1, the next smaller sizes of stones, clods and potatoes are permitted to pass through the openings of the next larger section 18 of screen 14. Larger and intermediate sizes of clods, stones and potatoes then are permitted to pass through the openings in section 20 of screen 14, followed by the largest sizes of stones, clods and potatoes being discharged through the openings of section 22 of screen 14.

As indicated above, the screen 14 is largely of conventional type and is rotatably supported by pairs of supporting and guide rollers 24 appropriately mounted respectively adjacent the outer ends of sections 18 and 22. The axis of the screen 14 extends downwardly from the end thereof in section 16 to the opposite end thereof in section 22. The slope is rather gradual and may be of the order of between 5 and 10° from the horizontal. The sorting screen 14 is rotated by a suitable power means, not shown, of conventional type, at a relatively slow speed. The discharging heterogeneous mixtures of material of the various size ranges determined by the sizes of the openings in the various sections of the screen fall into a collecting hopper 26 which is separated into various section by partitions 28 extending transversely across the same as shown in FIG. 2.

Each of the sections of hopper 26 are provided at one side with a discharge opening which, preferably, are progressively wider in size from the smaller section to the larger section of the screen 14. Accordingly, the smaller section has opening 30, the intermediate section has opening 32, and the largest size has opening 34. Associated with each of said discharge openings is an appropriate bucket-type conveyor 36. Said conveyors respectively vary in width as clearly shown in FIG. 2 in accordance with the different sizes of discharge openings 30, 32 and 34, formed in the sides of the sections of the hopper 26. Appropriate power means, not shown, is connected to one of the shafts 38 which support rollers around which the endless belt portions of the bucket conveyors 36 extend. Said conveyors move in the direction of the arrow shown in FIG. 1 for purposes of continuously picking up the size ranges of the objects which have been sorted according to size and deposited within the various sections of the hopper 14. When the objects reach the upper end of the various conveyors 36, they are discharged between spaced pairs of side plates 40 which direct the falling objects onto endless conveyors 42, 44 and 46.

It is to be understood that, for purposes of simplicity, potatoes, clods of earth and stones have been selected as typical, illustrative examples of mixtures of relatively smooth-surfaced sphere-like objects and relatively rough-surfaced sphere-like objects for purposes of illustrating the operativeness of the detecting and segregating mechanism of the present invention, details of which are described herein after. Also, it is to be understood that the assemblied mechanism shown particularly in FIGS. 1 and 2 may be supported stationarly in a sorting shed, or carried by a suitable vehicle and drawn by appropriate power means such as a tractor, for example, along a field from which potatoes are being harvested. In addition, if the sorting and segregating mechanism is of the portable type, it may be associated directly with the discharge end of a potatoe harvesting or digging mechanism such as appropriate plows and the like which are provided with suitable conveyors to discharge the unearthed potatoes, clods, and rocks into the hopper 12 for example. Further, any other types of mixtures of relatively smooth-surfaced sphere-type objects and rough-surfaced sphere-type objects capable of being segregated by the mechanism comprising the present invention may have the invention employed therewith and the selected examples of potatoes, clods, and rocks are merely intended to be exemplary of kinds of material which may be segregated by the present invention.

The endless conveyors 42, 44 and 46 extend around transversely spaced, parallel rolls 48 and 50 which are mounted upon suitable shafts extending between opposed, parallel and spaced side frame plates 52 and 54. It will be seen also from FIG. 2 that the conveyors 42, 44 and 46 are successively wider as the sizes of the objects which are to be conveyed thereby increase in size according to the classification thereof performed by the sorting screen 14.

For specific purposes to be described, it is preferred that the conveyors 42, 44 and 46 be of a compressible nature. For example, they may comprise suitable rubber or canvas base members upon which appropriate thickness of foam rubber or soft, foam-type synthetic resin is secured.

From FIG. 1, it will be seen that as the objects fall from the pockets or buckets of the conveyor 36, there will be some tendency for the same to bounce upon the compressible conveyors and in order to damp any such agitating movement, it is preferred that each of the conveyors be provided with a flexible damping element 56 which are suitably supported at one edge by a transversely extending bar 58 which, for example, is suitably connected to and supported by the upper edges of the pairs of side plates 40 which define channels of which the upper courses of the conveyors 42, 44 and 46 form the bottom surfaces. The damping elements 56 may be formed from any suitable flexible but slightly rigid sheet material such as certain types of semihard rubber, flexible synthetic resin and the like. The objects deposited upon the conveyors pass beneath the lower edges of the flexible damping elements 56 by moving the same upwardly sufficiently to permit passage beneath the free ends thereof, following which the damping members snap back toward the conveyor surface. For purposes of insuring that the objects will engage the segregating mechanism, described hereinafter, each conveyor also is provided with a shunting blade 60 which may be either rigid or somewhat resilient and can be formed from sheet metal, semi-hard rubber, synthetic resin, or otherwise. One edge of the blade in each instance is connected to a bracket 62 fixed to one of the side plates 40 adjacent one edge of each of the conveyors. As the objects are moved by the conveyors past the blade 60, they respectively are deflected or shunted toward one side edge of each conveyor for the following purposes.

SEGREGATING MECHANISM

Extending upward from each of the side frame plates 52 and 54 is an upright plate 64 which are fixedly secured to said side frame plates. Extending between the upper ends of the upright plates 64 is a transversely extending shallow supporting channel 66 which supports the plurality of units 68 for segregating sphere-like objects having different surface characteristics such as relatively smooth and relatively rough surfaces. In FIG. 2, it will be seen that the various units 68 are shown as being of a width approximately equal to that of the conveyor with which the unit is associated. Other than that characteristic however, the units essentially are the same and function similarly. Details of these units are best illustrated in FIGS. 3 and 4 and are described as follows.

Each of the units 68 comprise a supporting bracket 70 which is substantially U-shaped, the legs of each bracket being spaced apart transversely a distance approximately equal to the width of the conveyor with which the unit is associated. The legs of each bracket extends down from a central, horizontal bight portion 72 which is secured to supporting channel 66 by an appropriate bolt 74. Said bolt is arranged to permit a limited amount of adjustment of the bracket 70 about the axis of the bolt in order to change the angularity of the lower portion of the unit 68 relative to the longitudinal axis of the conveyor 42.

Connected to the lower ends of the legs of the bracket 70 is a plate 76 which has a pair of parallel supporting ears 78 extending in parallel relationship to each other from the opposite edges of the upper portion of plate 76. The ears 78 are pivotally connected to the legs of supporting brackets 70 by pivot bolts 80 which permit ready pivotal movement of the plate 76 relative to the bracket 70. Movement of the plate 76 in a clockwise direction relative to bracket 70, however, is restrained by means of a compression spring 82 of suitable force which surrounds guide rod 84. One end of spring 82 abuts a washer 86 adjacent a boss 88 having transverse opening in the lower end thereof through which a rod 90 extends. The upper end of spring 82 abuts an upper washer 92 through which a guide rod 84 extends for vertical movement.

Washer 92 abuts the lower surface of the supporting channel 66 and an additional guide washer 94 abuts the upper surface thereof. Guide rod 84 extends through the guide washer 94 as well as through a clearance opening 96 of substantially larger diameter than the guide rod 84 in order to permit a limited amount of lateral movement of the guide rod 84 with respect to the supporting channel 66 incident to operative movement of the guide rod in a manner described hereinafter.

Extending perpendicularyly from opposite vertical edges of plate 76 are a pair of parallel wings 98 which may be formed from the same sheet metal or other material as the plate 76, said wings being bent in similar direction so as to extend from said opposite edges of plate 76 in a direction opposite to that from which the supporting ears 78 extend from said plate. The rod 90 is of sufficient length that it extends between the upper portions of the wings 98 and the boss 88, as well as the shaft 84, are disposed substantially midway between the ears 98. From the details of the segregating unit 68 described thus far, it will be seen that the spring 82 will tend to resist, at least to a limited extent, movement of the plate 76 in a clockwise direction with respect to bracket 70.

Extending forwardly from the opposite end portions at the lower edge of the plate 78 are a pair of triangular ears 100 which are shown in small scale in FIG. 2. Said ears conveniently may comprise extentions of the lower edge of plate 76 and are integral therewith, the same being bent perpendicularly from the lower edge of plate 76 in directions opposite that from which the wings 98 extend. Connected to and extending between the outer ends of the ears 100 is an elongated element 102 which is spaced a predetermined distance above the normal upper surface of the endless conveyor beneath the segregating unit which serves said conveyor. As shown in FIG. 3, and also in FIG. 4 in full lines, the elongated element is spaced only a short distance above the upper surface of the compressible conveyors 42, 44 or 46. As explained in detail hereinafter however, said distance is variable in porportion to the size ranges of the objects 104 and 106 which are moved by the conveyors, in the direction of the illustrated arrows in FIGS. 3 and 4, into contact with the elongated transversely extending elements 102 associated respectively with said conveyors.

In order to maintain the elongated elements 102 and taut condition, suitable means are utilized such as a tightening turnbuckle unit 108, examples of which are shown in small scale in FIG. 2. The opposite ends of the turnbuckle units 108 respectively are connected to the outer and lower edge portions of the wings 98.

As shown in FIGS. 2 and 3 in particular, the elongated elements 102 comprise a wire of suitable diameter and tensile strength. However, it is to be understood that the member 102 may comprise a narrow blade, for example, of metal or other appropriate material having suitable tensile strength. The leading edge of the same however preferably should be of a rounded nature and somewhat resembling a wire surface for the following reasons.

When a smooth-surfaced object such as an exemplary potato 104, as shown in FIG. 3, is moved into engagement with the member 102, there is a tendency for the object to rotate clockwise, as illustrated by the exemplary arrow adjacent to top of the object 104. Also, particularly as shown in FIG. 2, the elements 102 are disposed at an angle other than 90° to longitudinal axis of the conveyors 42, 44 and 46. Such angle is adjustable in accordance with the sizes and types of objects being segregated by the units 68. Accordingly, in view of the fact that the objects are shunted to the nearest end of the angularly disposed elements 102 for contact by the objects 104, the rolling motion induced in said objects by sliding engagement of the smooth surfaces thereof with respect to the transverse elongated elements 102 will result in the objects progressively being moved to the opposite side of the conveyors for discharge, for example, into receiving channel 110 shown in exemplary manner in FIG. 2. Said channel, if desired, may have an appropriate conveyor, not shown, mounted thereon or the same may have a discharge opening disposed at the upper end of receiving chute 112, such as shown in exemplary manner in FIG. 1. Said chute may lead to any desired type of accumulating means, such as a bin or otherwise.

Referring to FIG. 4, in contrast to the smooth-surfaced objects 104 shown in FIG. 3, the exemplary rough-surfaced sphere-like objects 106, such as an exemplary rock or hard clod of earth, when brought into contact with the transversely extending elongated element 102 tends to frictionally engage the same and, instead of rotating to any appreciable extent at least, tends to somewhat adhere to the member 102, whereby continued forward movement of the object 106 by the conveyor belt results in pushing the element 102 forwardly and because of the pivotal mounting thereof, elevates the same in a manner illustrated in a series of phantom positions shown in FIG. 4, until the distance between the element 102 and the service of the conveyor permits passage of the rough-surfaced object 106 beneath the element 102. Under such circumstances, the rough-surfaced objects 102 continue along their path of movement upon the conveyor and are discharged at the outer end thereof into any suitable sort of accumulating or removel means, as desired. For example, a conveyor may receive the unwanted rough-surfaced objects and transport the same to a suitable storage means, conveyance or otherwise.

The compressibility of belts 42, 44 and 46 is an important feature of the invention for several reasons, particularly in handling rough-surfaced objects. One feature is that it provides required friction to move and tend to rotate the rough-surfaced objects 106. A second feature is that the dual frictional engagement of the object 106 similtaneously with element 102 and the compressible belt causes a wedging action which initiates pivotal movement of the element 102 and also effects limited depression of object 106 into the belt. This results in an increase in the lever arm between the two points of frictional engagement on object 106 and thereby facilitates pivotally moving element 102. The friction of the belt also facilitates rotation of objects 104 relative to element 102.

Immediately upon the rough-surfaced object 106 passing beyond the elevated element 102, the spring 82 serves to restore the element 102 and the bracket means which support the same to the initial position thereof nearest the conveyor, as shown in full lines in FIG. 4. It also should be understood in regard to the operation of the element 102, when contacted by smooth-surfaced objects 104, that the strength of the spring 82 is such as to minimize any tendency of the object 104 moving the element 102 from its normal operative position shown in FIG. 3 and also as shown in full lines in FIG. 4.

In accordance with the preferred manner of operating the segregating mechanism of the present invention, it has been found that the distance between the upper surface of the conveyors and the elongated elements 102 of the segregating unit should be no greater than approximately ⅛" and spaced forwardly of plate 76 a distance of about 33% of the average diameter of the size ranges of the objects to be handled by the units associated with each conveyor, up to a distance of about one inch. Also, the elongated elements 102 are disposed at an angle approximately 120° with the direction of movement of the conveyors, measured from the approach side of the plates 76, for example, which are parallel to the elements 102. In addition, it will be noted that because the plates 76 extend upward from the elongated elements 102 and forwardly therefrom a short distance, in the event there is any tendency for the objects 104 or 106 to ride or jump over the element 102, the plates 76 serve as a backstop to prevent the object from being moved forwardly by the conveyor under such circumstances.

Although the present illustrations show only three different sizes of segregating units respectively associated with three conveyors belts, such illustration is intended only to be exemplary. In order to accomplish relatively high speed type of operation and handle substantial quanities of objects which are to be segregated from each other according to the smoothness or roughness of the outer surfaces thereof, it is intended that this can be accomplished by providing a plurality of similar segregating units and conveyors for each size range of objects, as distinguished from furnishing only one segregating unit for each size range as shown in the present drawings. Further, the mechanism of the present invention is capable of discarding undesireable objects such as rotton or badly bruised objects such as potatoes due to the surface roughness of such objects under such circumstances. Accordingly, it will be observed that one of the essentially advantageous features of the present invention is the capability of the segregating units to detect the difference between rough and smooth surfaced objects by causing at least limited rotation of the same against transversely extending means such as elongated elements 102, whereby the roughness or smoothness of the surfaces of said elements is the criterion which permits substanially continuous rotation of smooth-surfaced objects for deflection from one side of the conveyor and thus segregate the same from the rough-surfaced objects which present sufficient friction to stop rotation when brought into contact with the elongated elements of the segregating unit and thereby result in causing such elements to be elevated and thereby permit the passage of the rough-surfaced objects beneath the same while remaining upon the conveyor for discharge at the outer ends thereof for example. The segregating function of the present invention therefor results in achieving effective segregation and separation of smooth-surfaced from rough-surfaced objects for example, automatically, with substantially no manual effort being required.

Further improvements now have been made relative to the embodiment of the invention illustrated in FIGS. 1–4. These improvements now comprise the structures and mechanisms illustrated in FIGS. 5–12 comprising an embodiment which, while including and operating upon basic principles similar to those employed in the embodiment of FIGS. 1–4, also is particularly adapted to be included in a mobile type of potato harvester adapted to be either self-propelled or pulled along a field by a tractor and, for example, supplied with power from said tractor such as by means of a conventional power take-off (p.t.o.). It is to be understood however, that this additional embodiment of the invention may, if desired, be employed in a sorting or packing shed and therefor be mounted in a stationary manner and powered by any suitable means such as an electric motor.

Figure 5:
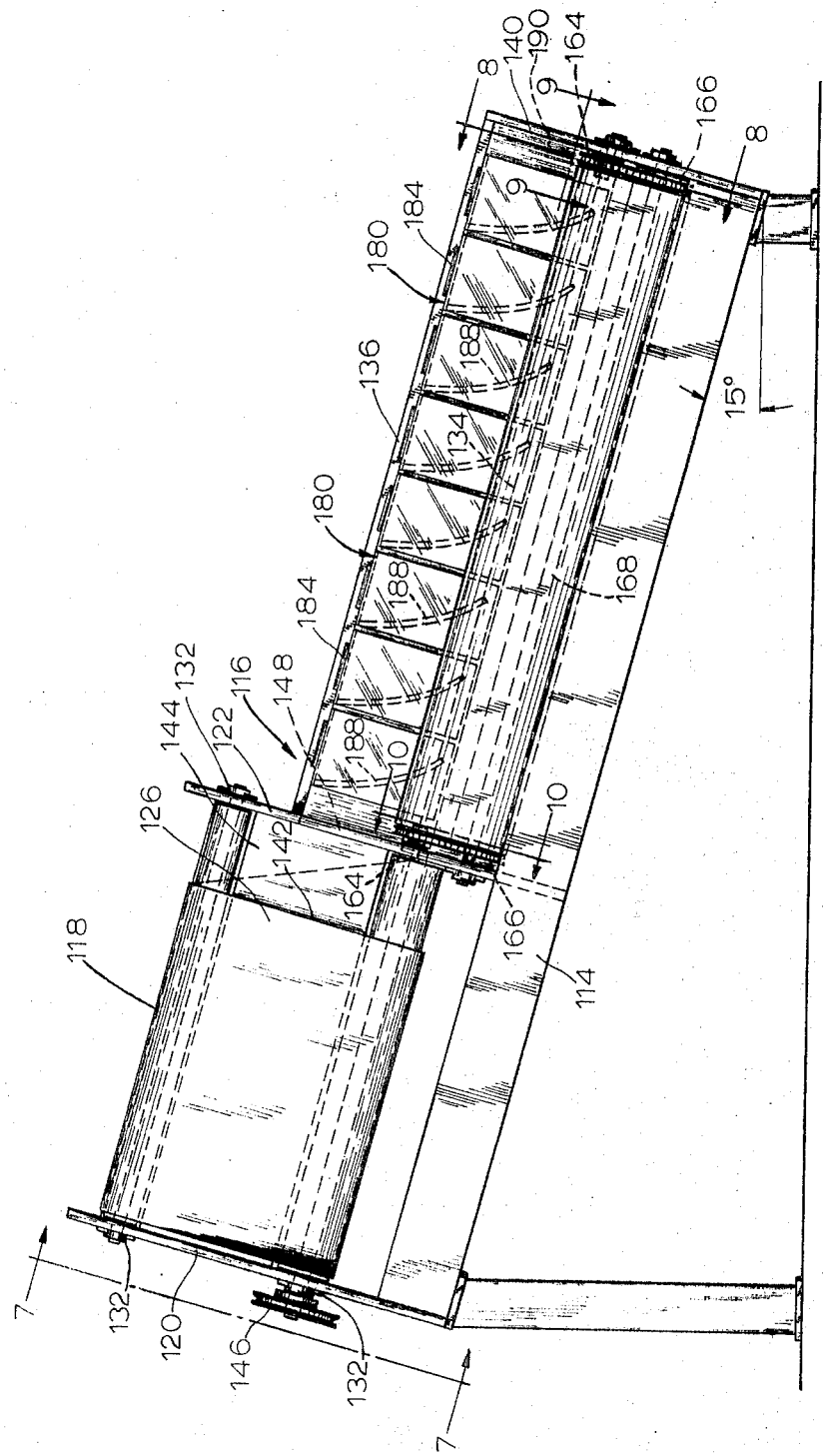
FIG. 5 is a side elevation of another exemplary embodiment of the invention of a more compact nature than that shown in FIGS. 1–4.
Figure 6:
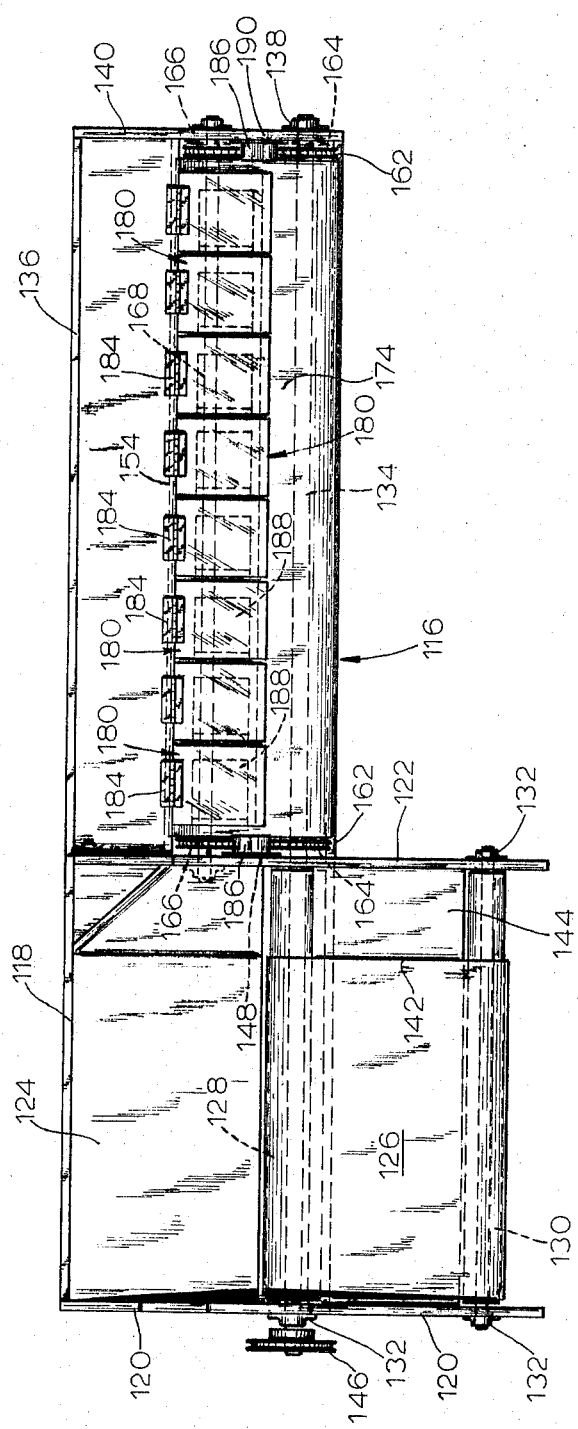
FIG. 6 is a top plan view of the embodiment shown in FIG. 5.

Referring to FIGS. 5 and 6, it will be seen that said aforementioned additional embodiment comprises a basic frame 114 which is illustrated as being mounted stationarily. However, it is to be understood that the frame 114 may be incorporated at a suitable location in any appropriate type of mobile potato harvester, not shown, by any suitable means. The primarily desired characteristic of this embodiment of the invention is that the longitudinal axis of the overall machine 116 be disposed at an acute angle to the horizontal, such as of the order of 15°, as indicated in exemplary manner in FIG. 5. It is to be understood however that this specific angle is to be considered as illustrative rather than restrictive. Such an arrangement has been found to operate highly satisfactorily however. The uppermost end of the machine 116, which is at the left hand end as viewed in FIGS. 5 and 6, is the inlet end and comprises a loading hopper 118 into which a heterogeneous mixture of smooth-surfaced and rough-surfaced items such as potatoes, clods of earth and rocks may be discharged for segregation of the potatoes, for example, from the clods of earth and rocks. The loading hopper 118 comprises end plates 120 and 122 which are fixedly supported by the basic frame 114.

Figure 7:
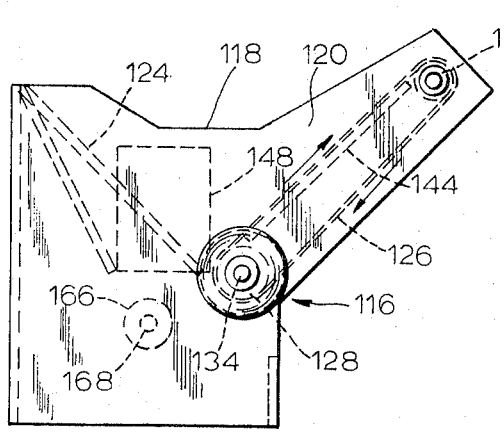
FIG. 7 is a vertical elevation of the inlet end of the mechanism shown in FIG. 5, as seen on the line 7—7 thereof.

Referring to FIG. 7, which is an end elevation of the machine shown in FIGS. 5 and 6, as seen from the left hand end thereof, the actual means within the hopper 118 which receive the objects referred to above comprise a stationary plate 124 which is disposed substantially at an angle of 45° to the horizontal, and the upper course of an endless flexible apron 126 which, preferably, is formed from frictional material, which may have a compressible upper surface and extends around a drive roller 128 which is mounted at a level below and inwardly from the idler roller 130. It will be seen that the upper course of te apron 126 is substantially at an angle of 90° to the stationary plate 124. The ends of the plate 124 respectively are fixed to the end plates 120 and 122, while the drive roller 128 and idler roller 130 respectively are mounted upon shafts which extend through the end plates 120 and 122 and are supported by appropriate bearings 132 carried by said end plates. The shaft 134 upon which the drive roller 128 is mounted also extends substantially beyond the end plate 122, through a channel compartment 136 and a bearing 138 carried by outer plate 140.

The apron 126 extends substantially from the end plate 120 toward the opposite end plate 122 but the edge 142 of apron 126 is spaced from the end plate 122. Said space is filled by an additional fixed plate 144, shown in FIGS. 5–7. The purpose of this arrangement is to prevent the heterogeneous objects being moved upwardly and out of the hopper over the upper edge of the apron 126, especially if somewhat of an overload of such objects are dumped into the hopper at any one time. It will be understood for example, that the hopper will be positioned upon a mobile potato harvester or the like in a location where suitable conveyors will deliever a mixture of such heterogeneous objects to the hopper 118 and dump them into it. Also, the drive shaft 134 has a sheave or sprocket gear 146 fixed to the end thereof adjacent the end plate 120 for connection to any suitable source of power upon the harvesting machine, for example.

Figure 8:
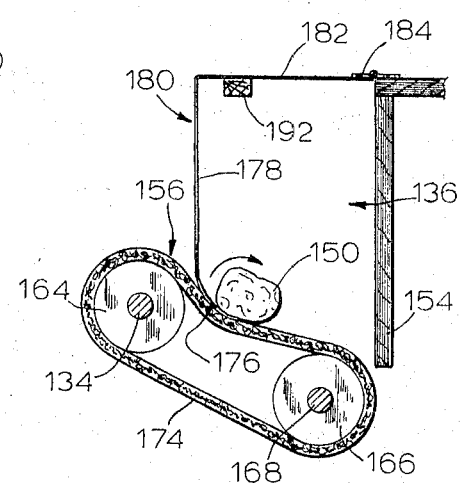
FIG. 8 is a vertical sectional view of the mechanism shown in FIG. 5, as seen on the line 8—8 thereof, and showing operation relative to a smooth-surfaced object.
Figure 11:
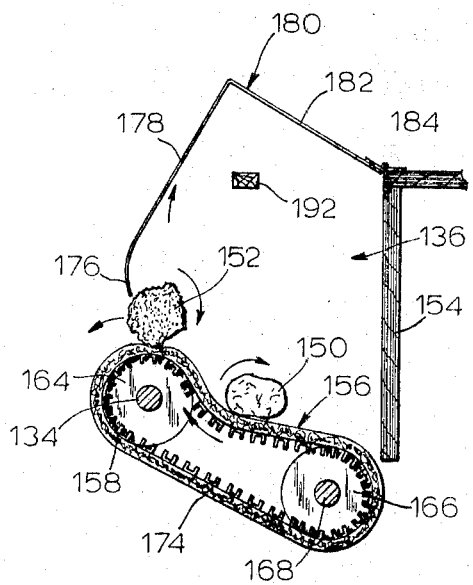
FIG. 11 is a view similar to FIG. 8 but showing operation relative to a rough-surfaced object which is shown in process of being discharged to waste.

As best seen in FIG. 7, the end plate 122 has a discharge opening 148 formed therein through which the heterogeneous mixture of objects, after being jostled and somewhat arranged in axial alignement within the hopper 118 is discharged into the channel compartment 136 in which segregation of the smooth-surfaced objects 150, shown in exemplary manner in FIG. 8, are separated from the rough-surfaced objects 152, one of which is shown in exemplary manner in FIG. 11. The channel compartment 136 is defined on one side by a substantially vertical stationary plate 154. The opposite side of said channel is defined by the upper course of an endless, flexible member or apron 156 which preferably is composed of a series of bars 158 which, in cross-section, preferably comprise U-shape channel members which are transversely spaced apart short distances by being connected at the end to alternate links 160 of chains 162 respectively mounted at opposite ends of the channel compartments 136.

Figure 12:
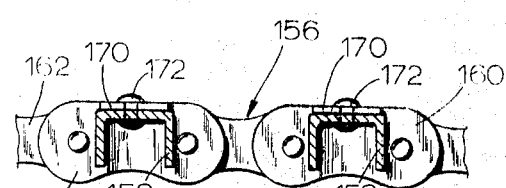
FIG. 12 is a fragmentary section of an endless flexible chain comprising part of the apron shown in FIGS. 8—11.

The chains 156 pass around and are supported by sprocket gears 164 and 166. The sprocket gears 164 are fixed to shaft 134 and are driven thereby, whereas the sprocket gears 166 respectively are connected to the opposite ends of idler shaft 168. Referring to FIG. 12, the manner in which the bars 158 are connected to the alternate links 160 is shown in detail. The links 160 have laterally extending flanges 170 integral therewith for connection of the ends of the channel-shaped bars 158 thereto by means of rivets 172. The bars 158 support an endless flexible blanket 174 which is of a compressible nature and is formed from suitable elastomeric material such as sponge rubber of suitable composition, sponge type synthetic resin of durable nature, or other suitable, preferably durable and compressible material capable of affording substantial friction particularly to the rough-surfaced objects 152 as the endless member or apron 156 is moved in the direction of the arrows shown in FIGS. 10 and 11 for purposes of moving the objects 150 and 152 in a tumbling manner within the channel formed between the upper courses of the member or apron 156 and the stationary plate 154, as can be best visualized in FIGS. 8 and 11. Such movement of the objects 150 and 152, to a large extent, is in a direction toward one side of the channel within the compartment 136 and therefor is generally transverse to the terminal ends 176 of the downwardly extending flanges 170 of substantially L-shaped detecting members 180. Said members 180 also have a substantially horizontal flange 182, the outer end of which is pivotally connected by means of a hinge 184 relative to the stationary plate 154 for example.

Figure 9:
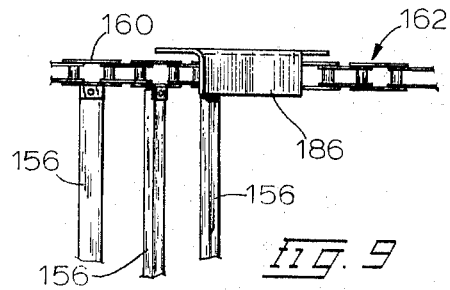
FIG. 9 is a fragmentary horizontal view of a part of the mechanism shown in FIG. 5 as seen on the line 9—9 thereof and showing a guide sleeve for one of the aprons of the mechanism.
Figure 10:
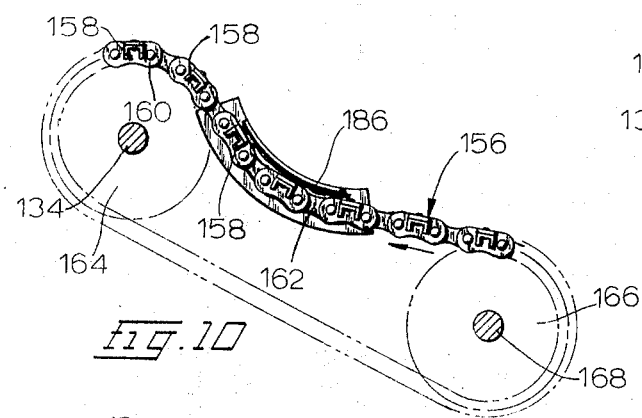
FIG. 10 is a fragmentary vertical elevation of said one of the aprons shown in FIG. 9 but showing the opposite end thereof, as seen on the line 10—10 of FIG. 5.

From FIG. 6, it will be seen that there is a series of the detecting members 180, all of the same being similar. For durability and stiffness, they may, for example, be formed from such material as stainless steel, although this is intended to be regarded as illustrative rather then restrictive. The series of detecting members 180 is substantially coextensive in length with the flexible member or apron 156 which is covered by the frictional blanket 174. The upper course of the member or apron 156 and its covering blanket 174 preferably is curved so as to provide a longitudinally extending concavity upon which the heterogeneous mixture of objects and material is supported and tumbled while the smooth-surfaced objects are being segregated from the rough-surfaced objects. Such configuration of said upper course is arranged by means of arcuate guide shoes 186, details of which are best shown in FIGS. 9 and 10. The relative positions thereof in plan view however are also shown in FIG. 6 in which it will be seen that the horizontally extending guide flanges thereon, which are directly engaged by the chains 162 of the flexible member or apron 156, extend toward each other. Under the circumstances, it will be understood that the blanket 174 which covers the major portion of the flexible member or apron 156 does not extend over the chain 162, whereby said blanket 174 does not interfere with the guide shoes 186.

Depending from the upstream edge of the horizontal flanges 182 of each of the detecting members 180 is a sheet 188 of flexible material such as rubber or flexible synthetic resin capable of acting as dampers which tend to spread out the flow of heterogeneous material as it moves along the channel in compartment 136 by means of the jostling afforded by the flexible member or apron 156 as well as the incline of the same, as best illustrated in FIG. 5. The dampers 188 don't unduly restrict the flow of such material and effectively serve to minimize jamming of the material while passing along said channel in compartment 136.

The channel compartment 136 terminates at its outer end with plate 140 provided with a suitable discharge opening 190 shown in FIGS. 5 and 6.

The operation of the separating and segregating function of the machine is best illustrated by comparing FIGS. 8 and 11. As the heterogenous mixture of smooth-surfaced and rough-surfaced objects move along the channel compartment 136 and are spread out by the function of the flexible damper sheets 188, there is a constant tendency for the upper course of the frictional blanket 174 to move the object upwardly along the arcuate surface of the apron 156. When, during such movement, the smooth-surfaced objects 150 encounter, for example, the terminal end 176 of the detecting members 180, the smooth nature of the objects 150 will merely result in said objects sliding with respect to the terminal ends 176 and no upward movement of the detecting members will occur. Ultimately, the smooth-surfaced objects 150 will roll longitudinally along the channel compartment 136 until they reach the discharge opening 190 in the outer plate 140. However, when a rough-surfaced object 152 encounters the terminal end 176 of any of the detecting members 180, the rough nature of said objects will effect frictional contact with terminal edge 176 and prevent any appreciable relative sliding movement therebetween, whereby the frictional engagement of the blanket 174 with respect to the rough-surfaced objects 152 will roll said objects in the direction of the arrow shown in FIG. 11 adjacent object 152 and thereby raise that particular detecting member 180 in such manner as to effect discharge of the object 152 between said terminal edge 176 of detecting member 180 and the blanket 174. Such discharge, for example, will be transverse or lateral with respect to the axis of the channel compartment 136. In the event the segregating unit comprising this embodiment of the invention is mounted upon a mobile potato harvester, the clods and stones represented by the object 152 in FIG. 11 will merely discharge onto the ground, whereas smooth-surfaced objects 150, such as potatoes, preferably will be discharged through opening 190 in outer plate 140 into a suitable compartment on the harvesting machine, or otherwise.

The terminal ends 176 of the detecting members 180 normally are maintained in slightly spaced relationship with the upper surface of the upper course of blanket 174 by means of a stop bar 192, shown in FIGS. 8 and 11, against which the horizontal flange 182 of the detecting members 180 are disposed when in the normal, non-ejecting position such as shown in FIG. 8. Also, following a discharge of one of the undesired rough-surfaced objects 152 with the resulting elevation of the detecting member 180 to its discharge position, gravity returns it to normal position.

Figure 13:
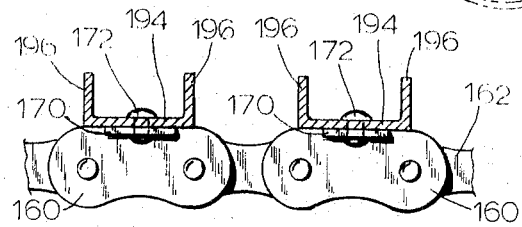
FIG. 13 is a fragmentary section of an endless flexible chain comprising part of another embodiment of flexible apron arrangement involving the use of inverted channel members per se.

As an alternative to the flexible blanket 174 shown in FIGS. 8 and 11, attention is directed to FIG. 13 in which a section of chain 162 is shown, the alternate links of which have flanges 170 thereon as in the chain shown in FIG. 12. However, in FIG. 13, the flanges 170 support the opposite ends of channel members 194 which are mounted thereon so that the flanges 196 thereof extend outwardly and provide a relatively rough or frictional surface on such alternate endless flexible member 156 comprising one wall of the channel of compartment 136, in lieu of the compressible blanket 174 shown in FIGS. 8 and 11.

In the preferred construction of the embodiment of FIG. 13, it is preferred that the channel members be about ½ inch wide and that successive members be spaced about ½ inch apart. Such an arrangement will provide adequate friction to engage rough-surfaced objects to move them against the detecting members 180, especially terminal edges 176 thereof, to raise the same for discharge of said rough-surfaced objects laterally from the channel compartment 136. Such spacing of the flanges 196 of channel members 194 from each other will not unduly bruise such smooth-surfaced objects as potatoes and will permit the same to roll readily for longitudinal movement along channel compartment 136.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. Mechanism to segregate relatively smooth-surfaced sphere-like objects from relatively rough-surfaced sphere-like objects comprising in combination, means arranged to receive a heterogeneous mixture of relatively smooth-surfaced and rough-surfaced sphere-like objects and move the same by rolling along a predetermined path, detecting means mounted adjacent said path and positioned relative to said path at a location to be engaged by said objects as they roll along said path, said detecting means being reactive to the surfaces of said objects and adapted to be moved from said path when engaged by rough-surfaced objects but remain in position relative to said path when smooth-surfaced objects encounter said detecting means, thereby being operable to segregate relatively rough-surfaced objects from relatively smooth-surfaced objects, and means to move said objects along said path.

2. The mechanism according to claim 1 in which said detecting means is mounted for movement from an initial position upon engagement by rough-surfaced objects to a position spaced above said path adequately to permit rolling passage of said rough-surfaced objects beneath the detecting means and elevate said means to effect discharge of such objects at a location separate from the smooth-surfaced objects.

3. The mechanism according to claim 2 in which said detecting means operates relative to conveyor means and is provided with a member extending generally across said predetermined path of said objects as rolled into contact therewith by said conveyor means, thereby to segregate rough-surfaced objects from smooth-surfaced objects.

4. The mechanism according to claim 3 in which said member upon said detecting means when engaged by smooth-surfaced objects induces a rolling movement thereon when engaged by said member and causes lateral movement across said conveyor as rolling of said smooth-surfaced objects is induced by said member.

5. The mechanism according to claim 4 in which said member extends transversely to said path of movement upon said conveyor means and comprise an elongated element extending across said conveyor means a predetermined distance above the surface thereof proportional to the diameter of a range of sizes of such smooth-surfaced objects to be segregated by said member from rough-surfaced objects.

6. The mechanism according to claim 5 in which said transversely extending member is supported by mechanism upon said segregating means operable to permit movement of said member toward and from said conveyor means and adapted to pass rough-surfaced objects beneath said member when moved away from said conveyor means, thereby to pass rough-surfaced objects beneath said elongated element as carried therefrom by said conveyor means to effect separation thereof from smooth-surfaced objects.

7. The mechanism according to claim 6 in which said supporting mechanism comprises a frame supported above said conveyor means for movement about a transversely extending axis spaced above said conveyor means a predetermined distance away from said conveyor means and operable to permit said member to be pivotally moved about said axis a sufficient distance to pass rough-surfaced objects there beneath due to said rough-surfaced objects frictionally engaging said member in a manner to effect such pivotal movement of said frame and member about the axis thereof.

8. The mechanism according to claim 7 in which said member is an elongated element having a surface suitable to frictionally engage rough-surfaced objects and thereby minimize rolling action of said objects upon said conveyor means in a manner to produce elevating movement of said elongated element upwardly away from said conveyor means a sufficient distance to permit passage of the rough-surfaced objects beneath said elongated element as continued movement thereof is effected by said conveyor means.

9. The mechanism according to claim 8 further including means adapted to restore said elongated element to its initial operating positions spaced a predetermined distance above said conveyor means, said predetermined distance being substantially less than that which is required to permit passage of said rough-surfaced objects beneath said elongated element.

10. The mechanism according to claim 9 in which said restoring means comprises a compression spring engageable with said pivoted frame and operable normally to provide limited resistance of movement of said frame about the pivotal axis thereof, said resistance being adequate to effect rolling action of smooth-surfaced objects against said elongated element and cause deflection thereof from one side of said conveyor means as caused by the angular disposition of said elongated element relative to the axis of said conveyor means.

11. The mechanism according to claim 7 in which said conveyor means is provided with a yieldable upper surface engageable by said heterogeneous mixture of objects and facilitate the function of said elongated element of said detecting means by permitting limited depression of said yieldable surface by said objects when the same encounter said elongated element.

12. The mechanism according to claim 3 further including means adjacent the receiving end of said conveyor means and operable to sort a heterogeneous mixture of different sizes of said rough-surfaced and smooth-surfaced objects into a limited number of size ranges, and transfer means positioned respectively to receive said respective size ranges of objects, and said mechanism also including conveyor means and segregating mechanism respectively provided for each of said size ranges and adapted to receive said size ranges to effect segregation of the rough-surfaced and smooth-surfaced objects from each other in each of said size ranges.

13. The mechanism according to claim 12 further including means mounted adjacent the edges of said conveyor means and adapted to receive respectively the size ranges of smooth-surfaced objects deflected respectively from said conveyor by the segregating means mounted adjacent the same.

14. The mechanism according to claim 13 in which said transfer means comprises elevator units and power means to drive the same.

15. The mechanism according to claim 14 further including damping means mounted adjacent said conveyor means and adapted to be engaged by said heterogeneous mixture of smooth-surfaced and rough-surfaced objects moved along said conveyor means following receipt thereof from said transfer means and thereby facilitate the functioning of said segregating means.

16. The mechanism according to claim 12 in which said transversely extending diverting member of each of said detecting means for the respective size ranges of objects is positioned at a different height above the respective conveyor means in accordance with the average diameters of said respectively sorted size ranges of objects, the diverting members for the larger sizes being spaced a greater distance above said conveyor means than the diverting members for the successively smaller size ranges are spaced above the conveyor means which move the same along said predetermined paths thereof.

17. The mechanism according to claim 16 in which said conveyor means for said respective size ranges of objects are compressible to facilitate the functioning of said diverting members relative to being engaged by both said smooth-surfaced and rough-surfaced objects incident to effecting segregation thereof from each other.

18. The mechanism according to claim 1 further including an inclined channel defining said predetermined path and having an object-receiving end positioned at a higher elevation than the opposite discharge end, one side of said channel being defined by an endless flexible member supported for movement of the upper course thereof upwardly away from the bottom of said channel, and said detecting means comprising at least one member having a portion thereof normally positioned relative to said upper course of said flexible member to prevent movement of smooth-surfaced objects therebetween and permit the same to move down said channel to discharge but rough-surfaced objects being engageable with said portion of said detecting member and induced by the action of said flexible member to move said portion of said detecting member away from said flexible member to permit passage of rough-surfaced objects therebetween for ejection from said channel.

19. The mechanism according to claim 18 further including a receiving hopper at said object-receiving end of said channel, one side of said hopper sloping upwardly and outwardly and comprising the outer course of an endless flexible member operable to jostle a heterogeneous mixture of objects to arrange the same for movement from the discharge end of said hopper into the object-receiving end of said channel.

20. The mechanism according to claim 19 in which said endless flexible member in said hopper extends from the outer end of said hopper toward the discharge end but terminating in spaced relation to said discharge end, and said side of said hopper also including stationary means extending from the discharge end of said hopper toward the outer end thereof substantially within the plane of said outer course of said flexible member and operable to prevent discharge of material from the top of said hopper prior to the same being discharged to said channel.

21. The mechanism according to claim 19 in which said endless flexible member extends around a pair of substantially parallel guide and drive rollers, said drive roller being lowermost, and means interconnected to said drive roller to rotate the same in a direction to move said outer course of said endless flexible member upwardly away from the bottom of said hopper.

22. The mechanism according to claim 21 in which said drive roller for said endless flexible member within said hopper is mounted upon and driven by a shaft, said shaft also extending along the lower portion of said channel and being operable to drive said endless flexible member defining said one side of said channel.

23. The mechanism according to claim 18 in which a plurality of said detecting members which are similar to each other are mounted in a longitudinal series extending in parallel relationship to the axis of said channel.

24. The mechanism according to claim 23 in which said detecting members are substantially L-shaped in end view and each comprise a downwardly extending flange terminating in an edge positioned adjacent said endless flexible member comprising one side of said channel.

25. The mechanism according to claim 24 in which the other flanges of said L-shaped members normally are positioned substantially horizontally relative to said channel and are pivotally connected at the outer ends of said other flanges to a member extending along in parallel relationship to the axis of said channel.

26. The mechanism according to claim 25 further including stop means positioned stationarily relative to said channel and adapted to be engaged by said L-shaped detecting members when in the lowermost positions therof in which the terminal ends of said downwardly extending flanges of said members are adjacent said endless flexible member comprising one side of said channel.

27. The mechanism according to claim 18 in which said endless flexible member comprising one side of said channel is composed of a series of similar bars extending parallel to each other and parallel to the axis of said channel, the ends of said bars being connected to links of a pair of similar chains respectively positioned and supported by guide and drive sprocket members positioned at opposite ends of said channel, said bars supporting a continuous sheet of compressible material extending around and connected to the outer surfaces of said bars to provide frictional engagement with the objects moving along said channel.

28. The mechanism according to claim 27 further including guide shoes engageable with the upper courses of said endless chains, said shoes being curved and slideably engaged by the outer surfaces of the upper courses of said endless chains to form a concave path for the bars and compressible sheet carried by said chains and forming one wall of said channel.

29. The mechanism according to claim 27 in which said sheet of compressible material comprises yieldable elastomeric material adapted to be engaged by objects moving along said channel in a manner to permit limited depression of said compressible material and thereby enhance the frictional engagement thereof with said objects.

30. The mechanism according to claim 29 in which a plurality of said detecting members are arranged in a series extending longitudinally along and at least partially above said channel, said members having downwardly extending terminal edges adapted to be engaged by the surfaces of rough-surfaced objects as impelled by said compressible sheet material and thereby cause said terminal edges of said detecting members to be raised away from said compressible material to permit passage of said rough-surfaced objects beneath said terminal edges for ejection from said channel.

31. The mechanism according to claim 18 in which said endless flexible member comprises a series of channel members extending along said channel between opposite ends thereof and the ends of said channel members respectively being connected to endless flexible chains supported adjacent opposite ends of said channel, the flanges of said channel members extending outwardly and thereby providing a relatively rough surface for frictional coaction with the surfaces of rough-surfaced objects to effect the ejecting thereof from said channel and thereby effect separation of said rough-surfaced objects from smooth-surfaced objects which continue to move along said channel for passage through discharge means at the end of the channel.

* * * * *